Patented Aug. 22, 1950

2,520,058

UNITED STATES PATENT OFFICE 2,520,058

METHOD OF MEASURING EXTENT OF OIL SATURATION OF POROUS MATERIALS

Paul P. Reichertz, Dallas, Tex., assignor, by mesne assignments, to Socony-Vacuum Oil Company, Incorporated, New York, N. Y., a corporation of New York No Drawing. Application January 6, 1949,
Serial No. 69,613

11 Claims. (Cl. 250—83.6)

This invention relates to the measurement of characteristics of porous materials with respect to fluids and relates more particularly to the determination of the extent of oil saturation of porous materials during such measurement of their characteristics.

It is highly desirable in many instances to measure quantitatively the characteristics of porous materials, such as soil, stone or rock, both naturally occurring and manufactured, porous glass and similar materials, with respect to fluids, i. e., their ability to retain fluids or to permit the passage of fluids therethrough, for the purpose of determining the suitability of the porous materials for particular purposes or the fluid conditions to be applied to obtain desired results. Among these characteristics of porous materials for which measurements are made is permeability which may be defined as the reciprocal of the resistance offered by the porous material to the flow therethrough of each phase of a multiphase fluid system with which the porous material is impregnated. Another characteristic is capillary pressure or the relative tendency of the porous material to retain each phase of a multiphase fluid system under static equilibrium conditions. A third characteristic is the flooding properties of the material, i. e., the tendency of the material to retain one liquid phase with which it is impregnated upon passage therethrough of one or more other fluid phases. To attach significance to the measurement of the characteristic of the materials, it is necessary to know the quantity of each fluid phase in the material, or the extent of saturation of the porous material with respect to each fluid phase, when equilibrium, under the procedures for measurement, have been established or to know the variation in the extent of saturation before or after establishment of equilibrium. One of the phases employed in making measurement of the characteristics of porous materials is an oil phase and difficulty has been encountered in determining the extent of oil saturation of the porous material. It has been proposed to measure the oil saturation by admixing an absorbent for X-rays with the oil passed to the porous material and measuring the extent of absorption of X-rays by the porous material as an indication of the extent of oil saturation of the material. However, such a large amount of absorbent must be added to the oil as to affect the properties of the oil and thereby make questionable the application of the data obtained to conditions wherein an oil free of such contaminant is present.

It is an object of this invention to provide a method for measuring the extent of oil saturation of a porous material. It is another object of this invention to provide a method for measuring the extent of oil saturation of a porous material during measurement of characteristics of the porous material. It is another object of this invention to provide a method for measuring the distribution of an oil which has been impregnated in a porous material. It is another object of this invention to provide a method for measuring the extent of oil saturation of a porous material without substantially affecting the properties of the oil. These and other objects of the invention will become apparent from the following description thereof.

In accordance with the invention, measurement of the extent of oil saturation of a porous material is made by employing, as the oil phase used for determining the characteristics of the porous material, an oil in which has been dissolved a small amount of an oil soluble radioactive metallo-organic salt comprising the di-dodecyl ester, tetrahydro ortho-phthalate of the cobalt isotope having a molecular weight of 60 and measuring, as a function of the extent of oil saturation of the porous material, the intensity of the gamma ray emission.

Di-dodecyl ester, tetrahydro ortho-phthalate of the cobalt isotope whose molecular weight is 60 is radioactive, resulting from the radioactivity of the cobalt isotope. Hereinafter, the cobalt isotope whose molecular weight is 60 will be termed "cobalt-60". The salt has the following structural formula

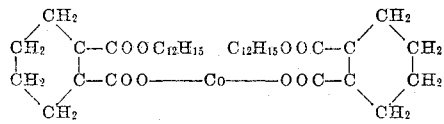

and may be prepared by reacting the oxide of cobalt-60 with di-dodecyl ester of tetrahydro ortho-phthalate acid.

The oil for use in measuring the characteristics of the porous materials is prepared by dissolving therein a sufficient amount of the salt to render the oil radioactive to a quantitatively measurable extent. Generally, an amount of the salt between about 0.05 and 0.15% by weight of the oil will give satisfactory results although larger amounts, and any smaller amounts rendering the oil radioactive to a desired extent, may be employed. The oil to be employed may be any of those commonly employed in determining characteristics of porous materials. Included among these oils are crude petroleum, kerosene, mineral seal oil, and light hydrocarbons such as a pentane, hexane, etc.

In measuring permeability, a multiphase liquid system is passed through a column or section of the porous material until equilibrium, with respect to the extent of saturation of the porous material with each phase, has been established and measurement of the flow rate, pressure drop, and extent of saturation is made.

Generally, the liquid phases are passed separately to a mixing head, comprising a porous material contacting the porous material whose permeability is being measured, to insure uniformity of distribution of the fluid phases prior to entry into the porous material. In determining the flooding properties of a porous material, the material is impregnated with a single or multiphase fluid and a single or multiphase fluid passed therethrough. Measurement of the amount of fluid removed from the porous material by the fluid passed therethrough is made. Generally, in the measurement of flooding characteristics, the porous material is impregnated with an oil phase and a gas or water phase passed through the porous material. In the determination of flooding properties, also, a mixing head may be employed where the fluids are multiphase. For measurement of capillary pressure, the porous material is completely saturated with one fluid phase, a known pressure of another fluid phase is imposed uniformly over the porous material whereby a portion of the first fluid phase is removed, as a result of the capillary forces set up within the material from the porous material through a diaphragm permeable only to the first fluid phase and the amount of the first fluid phase remaining in the porous material is measured.

In each of these determinations of the characteristics of porous materials, the extent of saturation of the porous material is measured, in accordance with the invention, by measuring the intensity of the gamma ray emission of the porous material. Measurement of the intensity of the gamma ray emission may be made by employing any suitable detector for gamma rays positioned adjacent to the porous material. An ionization chamber may be used for measuring the intensity of the gamma ray emission although it is preferred to use a Geiger-Muller counter in conjunction with a totalizer or integrator.

In measuring the extent of oil saturation of the porous material by determination of the intensity of gamma ray emission, the intensity of the gamma ray emission from the porous material free of any oil containing dissolved di-dodecyl ester, tetrahydro ortho-phthalate of cobalt-60 is first determined. The porous material or a sample thereof is then impregnated to complete saturation with the oil containing the dissolved salt of cobalt-60 and the intensity of the gamma ray emission of the completely saturated porous material determined. Knowing the intensity of gamma ray emission for zero oil saturation and for complete saturation, the extent of any intermediate saturation may be computed from the intensity by interpolation, since the intensity is a linear function of the extent of saturation.

To prevent gamma rays from a source other than the porous material reaching the detector, a suitable shield with a collimating slit is employed around the detector. Di-dodecyl ester, tetrahydro ortho-phthalate of cobalt-60 has a high gamma ray energy, being 1.1 and 1.3 million electron volts, and, accordingly, a comparatively massive shield must be employed to obtain effective collimation. Where lead shielding is employed, the greater portion of the gamma rays striking the detector will come through the collimating slit if the shielding has a minimum thickness of two inches. A greater thickness of lead shielding will result in improved collimation. However, greater thickness of shielding becomes cumbersome in addition to increasing the distance between the porous material and the detector with consequent reduction, by reason of the inverse square law, of the amount of gamma ray energy striking the detector from the porous material through the collimating slit. It is therefore preferable to employ a material having a greater shielding effect than lead, for example, tungsten alloyed, for ease in fabrication, with nickel and copper or with nickel and silver.

The collimating slit in the shielding may be sufficiently large to permit measurement of the gamma ray intensity from the entire sample of porous material whereby the average extent of oil saturation is measured. However, it may be desired to measure the extent of oil saturation at various cross sections along the sample of porous material, i. e., to measure the variation in the extent of the oil saturation over the length of the porous material as opposed to the average extent of saturation. Such measurements may be made by employing a collimating slit in the shielding of smaller size, the size depending upon the size of the cross section to be measured.

Di-dodecyl ester, tetrahydro ortho-phthalate of cobalt-60 is substantially insoluble in water. Thus, where a water phase is present in the porous material along with the oil phase, there will be no migration of the salt of cobalt-60 to the water phase from the oil phase which would lead to erroneous determinations of the extent of oil saturation since the gamma ray emission from the water phase cannot be distinguished from the gamma ray emission from the oil phase. The salt is, however, soluble in aqueous solutions of alkaline earth salts. Accordingly, where an oil phase and an aqueous phase containing dissolved alkaline earth salts are present in the porous material during measurement of the characteristics of the porous materials, migration of the salt of cobalt-60 from the oil phase to the aqueous solution phase is possible. On the other hand, since the oil phase and the aqueous solution phase will move through the porous material and the mixing heads with essentially streamline flow, there will be insufficient turbulence to cause migration of more than small amounts of the salt of cobalt-60. Additionally, the salt of cobalt-60 is substantially insoluble in aqueous solution of cobalt chloride and other inorganic salts of cobalt and insurance against migration may be obtained by employing solutions of these salts in place of alkaline earth salts where feasible.

Having thus described my invention, it will be understood that such description has been given by way of illustration and example only and not by way of limitation, reference for the latter purpose being had to the appended claims.

I claim:

1. In a process for determining the characteristics of a porous material wherein said porous material is impregnated with a plurality of liquid phases one of which phases is a water phase and another of which phases is an oil phase and said water phase and said oil phase are in contact with each other within said porous material, the method of measuring the extent of oil saturation of said porous material which comprises dissolving in said oil prior to impregnation of said porous material di-dodecyl ester, tetrahydro ortho-phthalate of cobalt-60, impregnating said porous material with the resulting oil solution, and thereafter measuring the gamma ray emission from said porous material as a function of the extent of oil saturation of said porous material.

2. In a process for determining the characteristics of a porous material with respect to liquids wherein said porous material is impregnated with a plurality of liquid phases one of which phases is a water phase and another of which phases is an oil phase and said water phase and said oil phase are in contact with each other within said porous material, the method of measuring the extent of oil saturation of said porous material which comprises dissolving in said oil prior to impregnation of said porous material a sufficient amount of di-dodecyl ester, tetrahydro ortho-phthalate of cobalt-60 to render said oil phase radioactive, and measuring the gamma ray emission from said porous material impregnated with said oil phase as a function of the extent of oil saturation of said porous material.

3. The method of claim 2 wherein the amount of di-dodecyl ester, tetrahydro ortho-phthalate of cobalt-60 dissolved in said oil is between about 0.05 and 0.25 per cent by weight.

4. In a process for determining the permeability of a porous material to a multiphase liquid system wherein said liquid system is passed through said porous material, one phase of which liquid system is a water phase and another phase of which liquid system is an oil phase and said water phase and said oil phase are in contact with each other within said porous material, the method of measuring the extent of oil saturation of said porous material which comprises dissolving in said oil prior to passing said oil through said porous material a sufficient amount of di-dodecyl ester, tetrahydro ortho-phthalate of cobalt-60 to render said oil phase radioactive, passing said oil phase through said porous material, and thereafter measuring the gamma ray emission from said porous material as a function of the extent of oil saturation of said porous material.

5. The method of claim 4 wherein the amount of di-dodecyl ester, tetrahydro ortho-phthalate of cobalt-60 dissolved in said oil is between about 0.05 and 0.15 per cent by weight.

6. In a process for determining the flooding characteristics of a porous material wherein said porous material is impregnated with a liquid phase and another liquid phase is passed through said porous material, one liquid phase being a water phase and the other liquid phase being an oil phase and said water phase and said oil phase are in contact with each other within said porous material, the method of measuring the extent of oil saturation of said porous material which comprises dissolving in said oil prior to passage of said oil to said porous material a sufficient amount of di-dodecyl ester, tetrahydro ortho-phthalate of cobalt-60 to render said oil phase radioactive, passing said oil phase to said porous material, and thereafter measuring the gamma ray emission from said porous material as a function of the extent of oil saturation of said porous material.

7. The process of claim 6 wherein the amount of di-dodecyl ester, tetrahydro ortho-phthalate of cobalt-60 dissolved in said oil is between about 0.05 and 0.15 per cent by weight.

8. In a process for determining the capillary pressure of a liquid phase within a porous material wherein a pressure of another liquid phase is imposed upon said porous material, one of said liquid phases being a water phase and the other of said liquid phases being an oil phase and said water phase and said oil phase are in contact with each other within said porous material, the method of measuring the extent of oil saturation of said porous material which comprises dissolving in said oil a sufficient amount of di-dodecyl ester, tetrahydro ortho-phthalate of cobalt-60 to render said oil phase radioactive, passing said oil phase to said porous material, and thereafter measuring the gamma ray emission from said porous material as a function of the extent of oil saturation of said porous material.

9. The process of claim 8 wherein the amount of di-dodecyl ester, tetrahydro ortho-phthalate of cobalt-60 dissolved in said oil is between about 0.05 and 0.15 per cent by weight.

10. In a process for determining the characteristics of a porous material with respect to liquids wherein said porous material is impregnated with a plurality of liquid phases, one of which phases is a water phase and another of which phases is an oil phase and said water phase and said oil phase are in contact with each other within said porous material, the method of measuring the extent of oil saturation of said porous material which comprises dissolving in said oil prior to impregnation of said porous material a sufficient amount of di-dodecyl ester, tetrahydro ortho-phthalate of cobalt-60 to render said oil phase radioactive, impregnating said porous material with the resulting oil solution, positioning a detector for gamma rays adjacent to said porous material, shielding said detector from gamma rays from a source other than said porous material, and measuring the gamma ray emission from said porous material as a function of the extent of oil saturation of said porous material.

11. In a process for determining the characteristics of a porous material with respect to liquids wherein said porous material is impregnated with a plurality of liquid phases one of which phases is a water phase and the other of which phases is an oil phase and said water phase and said oil phase are in contact with each other within said porous material, the method of measuring the extent of oil saturation of said porous material at a cross section thereof which comprises dissolving in said oil prior to impregnation of said porous material a sufficient amount of di-dodecyl ester, tetrahydro ortho-phthalate of cobalt-60 to render said oil phase radioactive, impregnating said porous material with the resulting oil solution, positioning a detector for gamma rays adjacent to said cross section of said porous material, shielding said detector from gamma rays from a source other than said cross section of said porous material, and measuring the gamma ray emission from said cross section of said porous material as a function of the extent of oil saturation of said cross section of said porous material.

PAUL P. REICHERTZ.

REFERENCES CITED

The following references are of record in the file of this patent:

UNITED STATES PATENTS

| Number | Name | Date |
| --- | --- | --- |
| 2,352,993 | Albertson | July 4, 1944 |